United States Patent [19]

Akamatsu

[11] Patent Number: 5,083,586
[45] Date of Patent: Jan. 28, 1992

[54] MOUNTING ARRANGEMENT FOR CONNECTING A FLUID PRESSURE VALVE TO A PIPE BRACKET BY A HOLLOW ADAPTER MEMBER

[75] Inventor: Osamu Akamatsu, Akashi, Japan
[73] Assignee: Nippon Air Brake Co., Ltd., Kobe, Japan
[21] Appl. No.: 696,420
[22] Filed: May 6, 1991
[30] Foreign Application Priority Data Jun. 6, 1990 [JP] Japan .................... 2-149149

[51] Int. Cl.⁵ .............................. F16L 3/00
[52] U.S. Cl. ........................ 137/343; 137/271; 137/347; 285/12; 285/124; 285/157
[58] Field of Search .......... 285/124, 125, 126, 12, 285/15, 157; 137/268, 271, 269, 315, 343, 347–350; 251/367, 366

[56] References Cited

U.S. PATENT DOCUMENTS

| | | | |
|---|---|---|---|
| 948,361 | 2/1910 | Webb, Jr. ............. | 137/347 |
| 1,559,949 | 11/1925 | Feldmeier ............ | 285/125 |
| 1,864,879 | 6/1932 | Youker ................ | 285/124 |
| 1,984,999 | 12/1934 | Stoddard ............. | 137/271 |
| 3,993,091 | 11/1976 | Loveless ............. | 137/271 |
| 4,539,961 | 9/1985 | Atkins et al. ....... | 137/271 |
| 4,917,143 | 4/1990 | Grooms ............... | 137/315 |

Primary Examiner—A. Michael Chambers
Attorney, Agent, or Firm—J. B. Sotak

[57] ABSTRACT

A tube seat installation device having a piping connecting part of a special coupling joint being attached on one side of the input piping opening or the output piping opening of the fluid pressure valve while at the same time having a cylindrical part of the special coupling joint fitted into a connecting hole of the tube seat via an O-ring sealing element. The piping connecting part of the special coupling joint is attached to the other side of an outlet piping opening or an inlet piping opening. The cylindrical part is fitted into the introduction part of the hollow body via an O-ring sealing element, or the introduction part of the hollow body is attached to the piping opening via an O-ring sealing element. A flange part of this hollow body is faced and fixed to another connecting hole of the tube seat via O-ring sealing element to which a fluid pressure valve is fixed by being sandwiched by the hollow body. A fluid path runs in the vicinity of the fluid pressure valve through a passageway so that it becomes possible to accommodate the flanges of different types which can be installed on a tube seat simply by using standard and inexpensive fluid pressure valves which have a piping opening fitted for a screw thread connection, and which can be mass-produced as a standard product.

12 Claims, 3 Drawing Sheets

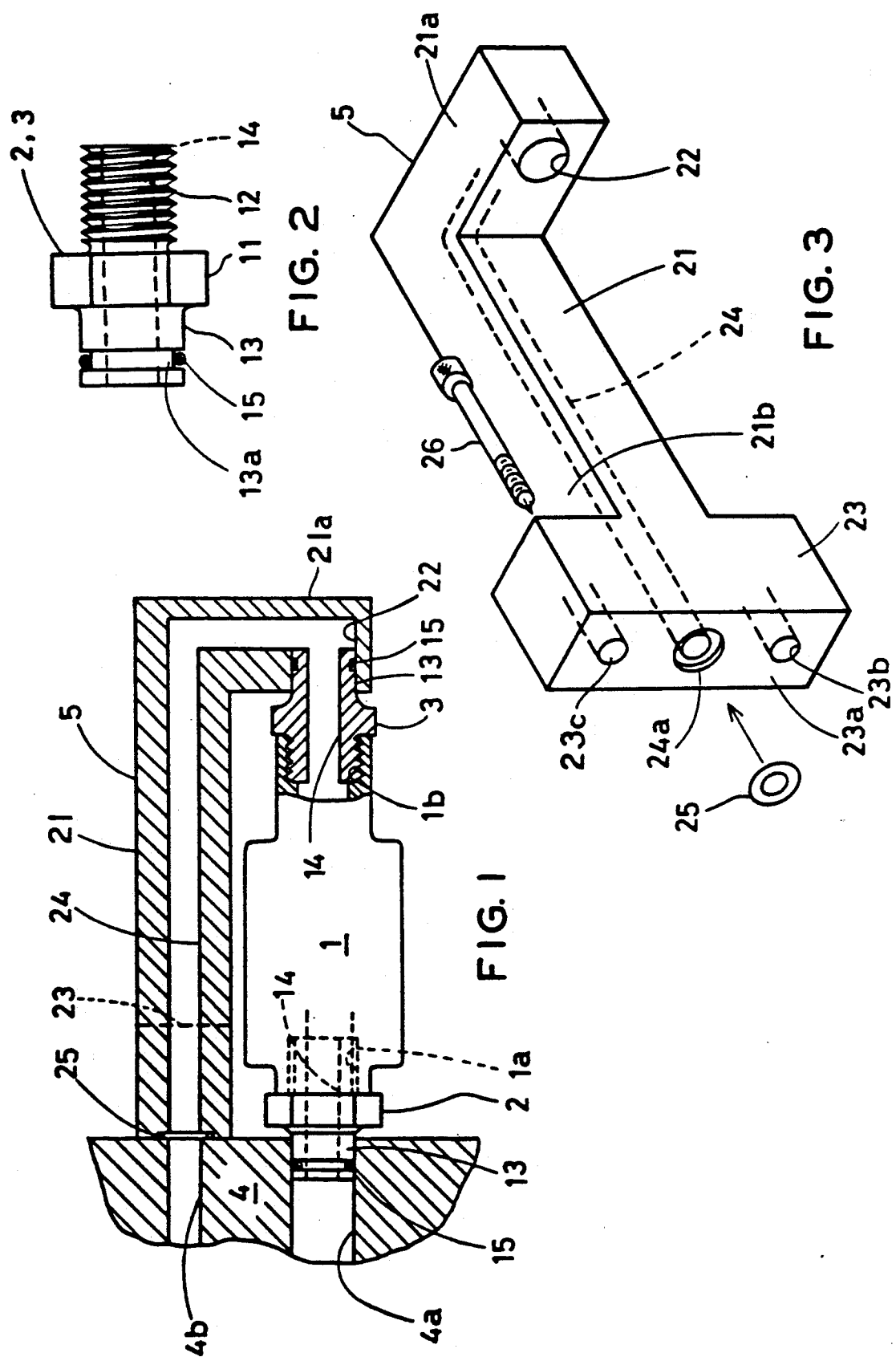

MOUNTING ARRANGEMENT FOR CONNECTING A FLUID PRESSURE VALVE TO A PIPE BRACKET BY A HOLLOW ADAPTER MEMBER

FIELD OF THE INVENTION

This invention relates to a mounting arrangement for connecting a fluid pressure valve to a pipe bracket by a hollow adapter member in an air brake control system on railroad vehicles and in particular to a piping arrangement in which a pneumatic or hydraulic pressure valve is mounted to a pipe bracket by a flanged pipe adapter member which has a cylindrical passageway for establishing fluid communication between the pressure valve and the pipe bracket.

BACKGROUND OF THE INVENTION

Normally, the inlet and outlet pipe openings of a pneumatic pressure valve are commonly used on general industrial equipment which is usually provided with screw threaded types of connections which simplifies the connection structure and reduces the overall cost. In other words, the input and output ports are provided with pipe thread openings which are connected to the fluid conveying piping.

On the other hand, a pneumatic pressure valve which is installed on a railroad car is connected to a pipe bracket which is usually a perforated block on which the pneumatic valves and piping to perform the required control functions of applying and releasing the air brakes. In practice, there are passageways which are equivalent to piping connections between the threaded openings of the metal pipe bracket and the valves. Usually, a flange is provided on one side of the pneumatic valve for connection purposes. In other words, the flange portion of the valve is provided with the inlet and outlet ports so that it is connected and fixed in alignment with the connection holes of the pipe bracket which are tightly sealed by rubber O-rings, gaskets, and the like. That is the pneumatic valve which is to be installed on the pipe bracket has an apertured flange. The flange portion is generally manufactured as an integral part of the valve body which is made by a casting process.

The main reason for mounting the pneumatic pressure valves used for the air brake control system of railroad vehicles on the multiple port pipe bracket is to be able to accommodate a number of different operating valves. In other words, the use of a pipe bracket allows the amount of the piping or tubing to dramatically be reduced while at the same time each of the different types of fluid pressure valves can be easily removed and replaced during normal maintenance and inspection periods.

However, the various types of pneumatic pressure valves to be installed in the air brake control system of a railroad car must be all manufactured with the same flange portion to match the pipe bracket. In addition, the mass produced pneumatic valves having the exact pipe connecting openings are expensive since the requisite reproduction is not always feasible. Therefore, the pneumatic valves having a flange type of interconnections generally must be produced in relatively small quantities. A separate casting mold must be made for each different valve. This results in reduced productivity and increased costs which is a competitive disadvantage. In other words, the valves cannot be simply mounted on the pipe bracket because of the required piping openings so that the main valve body must be changed to a flange type of device. Thus, the pneumatic valve must be a special type which means that it is expensive to make and produce. In addition, in order to produce a casted valve with a flange, it is necessary to use various core members in conjunction with the mold to form the required passageways so that such an operation is a very tedious and relatively expensive process.

OBJECTS AND SUMMARY OF THE INVENTION

Accordingly, it is an object of this invention to provide a new and improved pipe bracket mounting arrangement for a pneumatic valve which alleviates the above-mentioned problems.

Another object of this invention is to provide a unique pipe bracket mounting assembly for the installation of a fluid pressure valve in which inlet and outlet openings are connected to the pressurized fluid via threaded openings. A pipe bracket is utilized in which there is a number of connecting holes for permitting the passage of pressurized fluid. A threaded coupling insert has one end provided with a pipe connecting portion which is connected to the above-mentioned threaded openings of the fluid pressure valve and having another end which is cylindrically shaped to fit into a smooth bore opening of a hollow body member. A hollow body member has an introduction part facing the above-mentioned piping opening side on one side, and has a flange portion facing the above-mentioned pipe bracket. A pipe connecting portion of the above-mentioned coupling insert is installed on either the inlet pipe opening or the outlet pipe opening of the above-mentioned fluid pressure valve. At the same time, the cylindrically-shaped portion of the coupling insert is fitted into the connecting hole of the above-mentioned pipe bracket via an O-ring sealing element. The pipe connecting portion of the coupling insert is installed on the other side of the outlet pipe opening or the inlet pipe opening. At the same time, the cylindrically-shaped portion is fitted into the introduction part of the above-mentioned hollow body via an O-ring sealing element. The introduction part of the hollow body member is installed on the above-mentioned pipe opening via an O-ring sealing element. The flange portion of the passage body is installed and is bolted to the pipe bracket and is sealed by an O-ring sealing element.

A further object of this invention is to provide a mounting arrangement for connecting a fluid pressure valve device to a pipe bracket comprising, the fluid pressure valve device having inlet and outlet ports, a first coupling member connected to one of the inlet and outlet ports, a second coupling member connected to the other of the inlet and outlet ports, the first coupling member sealably connected to a first fluid port formed in the pipe bracket, a hollow body member having a fluid passageway, the second coupling member sealably connected to one end of the fluid passageway of the hollow body member, the hollow body member having a flange formed on the other end of the fluid passageway, the other end of the fluid passageway in sealable fluid communication with a second fluid port formed in the pipe bracket when the flange is securely attached to the pipe bracket.

In operation, one coupling insert member is installed onto the threaded inlet of a fluid pressure valve pipe opening and another coupling insert is installed onto the outlet pipe opening of a fluid pressure valve. The first coupling insert has a cylindrical portion which is fitted into the smooth bore connecting hole of the pipe bracket. Next, the second coupling insert has the cylindrical portion installed into the one end of a hollow body member. The other end of the hollow body member includes a flange which is bolted to the pipe bracket. Thus, the hollow body sandwiches the fluid pressure valve and at the same time provides the necessary fluid passageway to form a fluid connection between the fluid pressure valve to the pipe bracket.

DESCRIPTION OF THE DRAWINGS

The above objects and other attendant features and advantages will be more readily appreciated as the present invention becomes better understood by reference to the following detailed description when considered in conjunction with the accompanying drawings, wherein:

FIG. 1 is an elevational view, partly in section and partly in outline, of a mounting arrangement for connecting a fluid pressure valve device to a pipe bracket in accordance with the present invention.

FIG. 2 is a side elevational view, partly in section, of a threaded coupling insert which fits the valve device to the pipe bracket and to a flanged L-shaped hollow body member.

FIG. 3 is a perspective view from the side of the flanged L-shaped hollow body member.

DETAILED DESCRIPTION OF THE INVENTION

Figure 4:
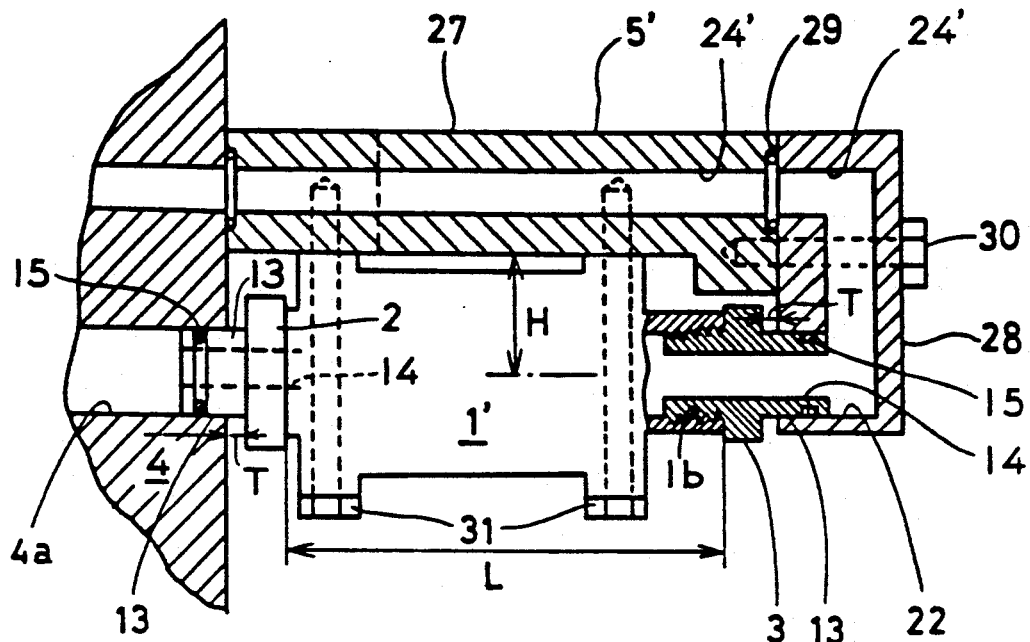
FIG. 4 is an elevational view, partly in section and partly in outline, of a second embodiment of a mounting arrangement for attaching a valve device to a pipe bracket.

Referring now to the drawings and in particular to FIG. 1, there is shown a partial cross-sectional view of a fluid pressure valve mounting arrangement in accordance with the present invention.

As shown in FIG. 1, the mounting arrangement for connecting the pneumatic pressure valve 1 to a cast pipe bracket 4 includes a pair of pipe thread coupling inserts 2 and 3 and a flanged adapter member 5. The threaded male portions of the coupling inserts or members are screwed into female openings 1a and 1b formed on the respective ends of the fluid or pneumatic pressure valve 1. The adapter member 5 includes a cast L-shaped hollow body portion which is adapted to support and confine the pneumatic valve 1 by having the push-on end of one coupling insert 2 placed into the smooth bore opening formed in the pipe bracket 4 and by having the push-on end of the other coupling insert 3 placed into the smooth bore opening 22 formed on the short leg 6a of the flanged L-shaped adapter member 5.

Turning now to FIG. 2, there is shown a general representation of the coupling inserts 2,3 which are substantially identical in construction. As shown, the one or right end of the insert 2,3 is provided with pipe threads 12 while other or left end of the insert 2,3 is provided with cylindrical stem portion 13. A central hexagonal nut 11 or the like is formed between the pipe connecting portion 12 and the other push-on cylindrical portion 13 for accommodating a suitable wrench. It will be seen that a fluid passageway 14 is formed through the center of insert 2,3. The male pipe connecting portion 12 may be either a PT thread or a PF thread which matches the female threaded inlet and outlet pipe openings 1a and 1b formed in the respective ends of the valve device 1. The cylindrical stem portion 13 of insert 2,3 is formed with a circumferential or annular groove 13a for accommodating a sealing rubber O-ring 15. That is, the O-ring 15 is seated in the circumferential groove 13a to prevent fluid leakage. In practice, the cylindrical stem portion 13 of insert 2 is placed into the smooth bore connecting hole or port 4a of the pipe bracket 4 while the cylindrical stem 13 of insert 3 is introduced into the circular opening 22 of the hollow body member 5, which will be described hereinafter.

As shown in FIG. 3, the L-shaped hollow body 5 includes a circular opening or port 22 formed in the inner face of the short leg or arm 21a which is integral with the long leg or arm 21. It will be seen that the remote end 21a of the long leg 21 is provided with a transverse flange member 23. Thus, the transverse flange member 23 and the long leg 21 form a T-shaped portion hollow body 5. As shown, a fluid path or passageway 24 extends from the circular port 22 along the length of the L-shaped body 21 and opens at the frontal surface 23a of the flange member 23.

Thus, a rubber O-ring 25 can be fitted into the groove 24a to act as a sealing element. The flange member 23 has two through bolt holes 23b and 23c for accommodating a pair of tie bolts (one shown at 26) to fix the adjacent surface 23a of the flange member 23 on the flat surface of the pipe bracket in an air-tight manner.

Referring again to FIG. 1, it will be appreciated that, after the male threaded portions of the coupling inserts 2 and 3 are screwed into the female thread openings 1a and 1b of the fluid pressure valve 1, the cylindrical portions 13 are inserted into the smooth bore openings 4a and 22 which form the inlet and outlet ports of the pneumatic valve 1. That is, the cylindrical portion 13 of the coupling insert 2 is fitted into the connecting hole 4a and is effectively sealed by the O-ring 15 while the cylindrical portion 13 of the coupling insert 3 is fitted into the connecting hole 22 and is effectively sealed by the O-ring 15. Then the fluid flow path 24 of the hollow body 5 is in communication with the connecting hole 4b of the pipe bracket 4. The L-shaped hollow body member 5 is firmly attached to the pipe bracket 4 by bolts 26 which pass through holes 26b and 26c formed in the flange member 23. An air-tight seal is formed by the O-ring 25. In this assembled state, the space between the connecting holes 4a and 4b is connected through the fluid flow path 24 of the hollow body member 5 and the fluid flow path 14 of the coupling inserts 2 and 3. In addition, the fluid pressure valve 1 is rigidly fixed, since the cylindrical stems 13 of the coupling inserts 2 and 3 are securely fitted into the connecting hole 4a of the pipe bracket 4 and the connecting hole 22 of the hollow body member 5. In addition, the interfitting parts of the coupling inserts 2 and 3 and the ports 22 and 24a of the L-shaped hollow body 5 are effectively sealed by the O-rings 15 of the cylindrical stems 13 and the O-ring 25 inserted in groove 24 of the flange member 23.

Now a second or modified embodiment of a pneumatic pressure valve mounting arrangement will be explained with reference to FIG. 4. The difference between the embodiment illustrated in FIG. 1 is that the L-shaped hollow body member 5' is divided into two pieces, a first long leg element 27 and a second short leg element 28. The two pieces are joined together by a bolt 30 and the passageway 24' is sealed by O-ring 29. In other words, when the distance L between the input and output ports of the pneumatic valve 1 varies, there is a certain tolerance T which may be taken up by the cylindrical portion 13 of the male threaded coupling inserts 2 and 3. Thus, the tolerance T is the fitting of the circular opening 22 of the hollow body 5' and the bore hole 4a. Now when the pneumatic valve 1' is placed between the pipe bracket 4 and the hollow body 5' there is play along the longitudinal direction of passageways 14. Thus, the pneumatic valve 1' and the hollow body 5' can be rigidly fixed by means of tie bolts 31. In addition, when the pneumatic valve 1' and the hollow body 5' are fixed by means of a bolt 30, the two parts become an integral body so that removal and assembly become relatively easy. At this time, even if a slight difference exists in the height H of the pneumatic valve 1', this difference can be taken up by the dividing surfaces of the first element 27 and the second element 28.

Figures 5A, 5B:
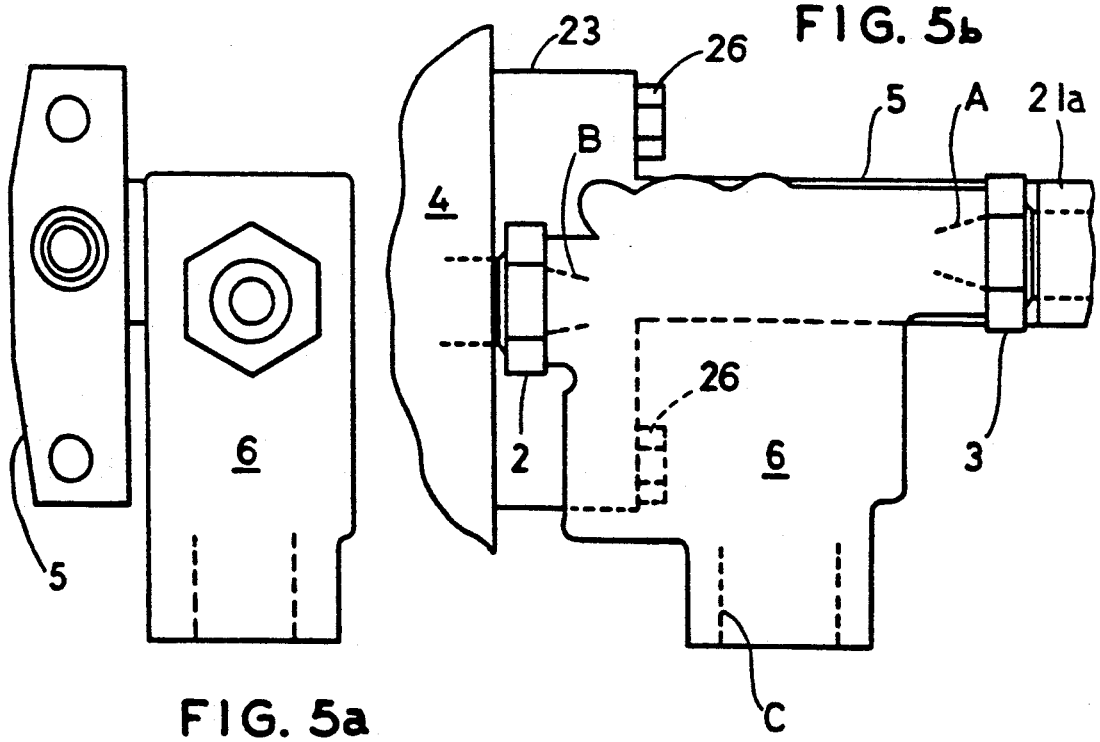
FIG. 5a is an end elevational view of a pneumatic valve device and an L-shaped hollow body member.
FIG. 5b is a side elevational view of FIG. 5a with the pipe bracket.

Referring now to FIG. 5, there is shown the mounting arrangement which is applied to the pneumatic control valve. Control valve 6 has three operating positions: open, closed, and lap. It will be seen that FIG. 5a is a side view, while FIG. 5b is a front view. The pneumatic control valve 6 has an inlet port A, an outlet port B and an exhaust port C. When the tube seat installation device with the special joints or fillings 2 and 3 and the hollow body 5 is applied to this air pressure control valve 6, it can be installed on the pipe bracket 4. Since the fluid is air, the exhaust port C is opened to the atmosphere. However, if hydraulic fluid is used, the exhaust port can be returned to the pipe bracket 4 via another hollow body member.

Figure 6:
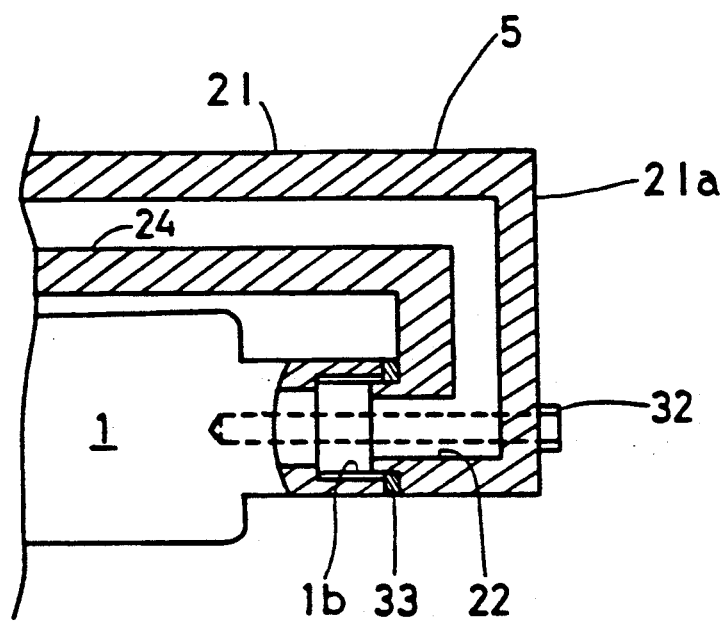
FIG. 6 is a partial elevational view, partly in section and partly in outline, of a third embodiment of a valve device and hollow body member.

In the previous embodiments of this invention, as can be seen in FIG. 1, the threaded opening 1b side also has a threaded coupling insert 3. But, as can be seen in FIG. 6, the structure can be one in which the threaded opening 1b, which faces the hollow body 5, can include a gasket sealing element 3. In that case, for example, the part 22 and the opening 1b can be press-fitted and fastened by a tie bolt 32.

In each of the embodiments of this invention there is indicated the case in which the inlet and the outlet are in the direction of the front and back of the pipe bracket. However, even if the inlet and outlet are at a 90° angle, the mounting arrangement of this invention can be used by bolt-tightening of the hydraulic valve with the hollow body.

Now, although it is not directly related to the principal theory of this invention, the invention can be practiced without the hollow body. In such a case, one coupling insert can be configured as a long L-shaped member, and the cylindrical portion of the coupling insert of the inlet and outlet openings can be inserted into the respective connecting holes of the pipe bracket.

The following is a numerical listing of the various parts used in the present invention:
1, 1': Fluid Pressure Valve
1a, 1b: Threaded Pipe Opening
2, 3: Pipe Thread Coupling Insert
4: Pipe Bracket
4a, 4b: Smooth Bore Connecting Hole
5: Flanged Hollow Body
11: Hexagonal Nut tightening Portion
12: Male Screw Thread
13: Cylindrical Adapter Portion
14: Bore Through Coupling Insert
15, 25: O-ring Sealing Element
21a: Short Leg
21b: Long Leg
22: Adapter Bore
23: Mounting Flange
24: Through Hole Thus, the present invention has been described in such full, clear, concise and exact terms as to enable any person skilled in the art to which it pertains to make and use the same, and having set forth the best mode contemplated of carrying out this invention. I state that the subject matter, which we regard as being my invention, is particularly pointed out and distinctly asserted in what is claimed. It will be understood that variations, modifications, equivalents and substitutions for components of the above specifically-described embodiments of the invention may be made by those skilled in the art without departing from the spirit and scope of the invention as set forth in the appended claims.

What I claim is:

1. A mounting arrangement for connecting a fluid pressure valve device to a pipe bracket comprising, said fluid pressure valve device having inlet and outlet ports, a first coupling member connected to one of said inlet and outlet ports, a second coupling member connected to the other of said inlet and outlet ports, said first coupling member sealably connected to a first fluid port formed in said pipe bracket, a hollow body member having a fluid passageway, said second coupling member sealably connected to one end of said fluid passageway of said hollow body member, said hollow body member having a flange formed on the other end of said fluid passageway, said other end of said fluid passageway in sealable fluid communication with a second fluid port formed in said pipe bracket when said flange is securely attached to said pipe bracket.

2. The mounting arrangement for connecting a fluid pressure valve device to a bracket as defined in claim 1, wherein said fluid pressure valve device is a pneumatic valve.

3. The mounting arrangement for connecting a fluid pressure valve device to a pipe bracket as defined in claim 1, wherein said fluid pressure valve device is a hydraulic valve.

4. The mounting arrangement for connecting a fluid pressure valve device to a pipe bracket as defined in claim 1, wherein said first coupling member is screwthreaded to said one of said inlet and outlet ports.

5. The mounting arrangement for connecting a fluid pressure valve device to a pipe bracket as defined in claim 1, wherein said second coupling member is screw threaded to said other of said inlet and outlet ports.

6. The mounting arrangement for connecting a fluid pressure valve device to a pipe bracket as defined in claim 1, wherein said first coupling member includes a cylindrical stem and an O-ring for being sealably connected to the first fluid port formed in said pipe bracket.

7. The mounting arrangement for connecting a fluid pressure valve device to a pipe bracket as defined in claim 1, wherein said second coupling member includes a cylindrical stem and an O-ring for being sealably connected to the one end of said fluid passageway of said hollow body member.

8. The mounting arrangement for connecting a fluid pressure valve device to a pipe bracket as defined in claim 1, wherein said other end of said fluid passageway is provided with an O-ring for being in sealable fluid communication said second fluid port formed in said pipe bracket when said flange is attached to said pipe bracket.

9. The mounting arrangement for connecting a fluid pressure valve device to a pipe bracket as defined in claim 1, wherein said flange is bolted to said pipe bracket.

10. The mounting arrangement for connecting a fluid pressure valve device to a pipe bracket as defined in claim 1, wherein said hollow body member is an integral L-shaped structure which confines said fluid pressure valve device.

11. The mounting arrangement for connecting a fluid pressure valve device to a pipe bracket as defined in claim 1, wherein said hollow body member is a two-piece L-shaped assembly which confines said fluid pressure valve device.

12. The mounting arrangement for connecting a fluid pressure valve device to a pipe bracket as defined in claim 1, wherein said second coupling member is press-fitted and is sealably connected to the one end of said fluid passageway of said hollow body member by a gasket sealing element.

* * * * *